(12) United States Patent
Liu et al.

(10) Patent No.: US 10,794,570 B2
(45) Date of Patent: Oct. 6, 2020

(54) OPTICAL ELEMENT, LIGHT SOURCE MODULE AND LIGHTING DEVICE

(71) Applicant: OPPLE LIGHTING CO., LTD., Shanghai (CN)

(72) Inventors: Chaobo Liu, Shanghai (CN); Feng Li, Shanghai (CN)

(73) Assignee: Opple Lighting Co., Ltd., Shanghai (CN)

( * ) Notice: Subject to any disclaimer, the term of this patent is extended or adjusted under 35 U.S.C. 154(b) by 139 days.

(21) Appl. No.: 16/225,138

(22) Filed: Dec. 19, 2018

(65) Prior Publication Data

US 2019/0120464 A1 Apr. 25, 2019

Related U.S. Application Data

(63) Continuation of application No. PCT/CN2017/084367, filed on May 15, 2017.

(51) Int. Cl.
*F21V 13/02* (2006.01)
*F21V 14/00* (2018.01)
(Continued)

(52) U.S. Cl.
CPC .............. *F21V 14/006* (2013.01); *F21V 3/02* (2013.01); *F21V 3/10* (2018.02); *F21V 5/007* (2013.01);
(Continued)

(58) Field of Classification Search
CPC . F21V 14/006; F21V 3/10; F21V 3/02; F21V 5/007; F21V 5/04; F21V 13/02;
(Continued)

(56) References Cited

U.S. PATENT DOCUMENTS

2010/0277952 A1* 11/2010 Chien .................. F21S 10/007
362/641
2012/0113652 A1 5/2012 Sakurai
(Continued)

FOREIGN PATENT DOCUMENTS

CN 201302099 Y 9/2009
CN 202338860 U 7/2012
(Continued)

OTHER PUBLICATIONS

International Search Report (including English translation) and Written Opinion issued in PCT/CN2017/084367, dated Aug. 2, 2017, 12 pages.

*Primary Examiner* — Bao Q Truong
(74) *Attorney, Agent, or Firm* — Arch & Lake LLP

(57) ABSTRACT

Examples of the present disclosure disclose an optical element, a light source module using the optical element and a lighting device using the light source module. The optical element includes: a light distribution portion configured to receive irradiated light emitted from a light-emitting unit and allow the irradiated light to be emitted upon distribution, where the light emitted from the light distribution portion upon distribution has an irradiation range; and a light-shielding portion provided integrally with the light distribution portion, where the light-shielding portion is engaged with the light distribution portion to form a light-shielding receiving chamber, and the light-shielding receiving chamber is located outside the irradiation range.

20 Claims, 5 Drawing Sheets

(51) Int. Cl.
  *F21V 3/10*    (2018.01)
  *F21V 3/02*    (2006.01)
  *G02B 19/00*   (2006.01)
  *F21V 5/04*    (2006.01)
  *F21V 5/00*    (2018.01)
  *G02B 5/00*    (2006.01)
  *F21V 23/00*   (2015.01)

(52) U.S. Cl.
  CPC ................ *F21V 5/04* (2013.01); *F21V 13/02* (2013.01); *G02B 19/0019* (2013.01); *G02B 19/0066* (2013.01); *F21V 23/005* (2013.01); *G02B 5/003* (2013.01)

(58) Field of Classification Search
  CPC .......... F21V 23/005; F21V 5/00; F21V 5/048; F21V 13/00; G02B 19/0019; G02B 19/0066; G02B 5/003
  See application file for complete search history.

(56) References Cited

U.S. PATENT DOCUMENTS

2015/0241033 A1\* 8/2015 Kurita .................... F21V 17/06
                                                          362/311.14
2016/0024767 A1\* 1/2016 Hong ...................... E03C 1/057
                                                          4/668

FOREIGN PATENT DOCUMENTS

| CN | 202371632 U  | 8/2012  |
|----|--------------|---------|
| CN | 202615726 U  | 12/2012 |
| CN | 103277740    | 9/2013  |
| CN | 105222097    | 1/2016  |
| CN | 105222097 A  | 1/2016  |
| CN | 105953179 A  | 9/2016  |
| CN | 205717034 U  | 11/2016 |
| JP | 4966833 B    | 6/2009  |
| JP | 5669099 B    | 10/2012 |

\* cited by examiner

OPTICAL ELEMENT, LIGHT SOURCE MODULE AND LIGHTING DEVICE

CROSS-REFERENCE TO RELATED APPLICATIONS

This application is based upon and claims the priority of PCT patent application No. PCT/CN2017/084367 filed on May 15, 2017 which claims the priority of Chinese Patent Application No. 201610485451.8 filed on Jun. 28, 2016 and Chinese Patent Application No. 201620654473.8 filed on Jun. 28, 2016, the entire content of all of which is hereby incorporated by reference herein for all purposes.

TECHNICAL FIELD

The present disclosure relates to the field of lighting technology, and particularly to an optical element, a light source module and a lighting device.

BACKGROUND

With the rapid development of lighting technology, the lighting device is gradually becoming popular in people's lives. An lighting device generally emits irradiated light from an electrically driven light-emitting unit, and receives the irradiated light emitted from the light-emitting unit through a light distribution portion which is located in a light-emitting direction of the light-emitting unit and is made of a light transmittance material, so as to distribute the irradiated light emitted from the light-emitting unit to satisfy user's demand.

SUMMARY

The present disclosure provides an optical element as well as a light source module and a lighting device using the same.

Examples of the present disclosure provide an optical element for a light source module in a lighting device. The optical element may include a light distribution portion configured to receive irradiated light emitted from the light-emitting unit and allow the irradiated light to be emitted upon distribution, where light emitted from the light distribution portion upon distribution has an irradiation range; and a light-shielding portion provided integrally with the light distribution portion, where the light-shielding portion engages with the light distribution portion to form a light-shielding receiving chamber, and the light-shielding receiving chamber is located outside the irradiation range.

Examples of the present disclosure also provide a light source module. The light source module may include: a light-emitting unit; a substrate configured to support the light-emitting unit; and an optical element which may include a light distribution portion configured to receive irradiated light emitted from the light-emitting unit and allow the irradiated light to be emitted upon distribution, where light emitted from the light distribution portion upon distribution has an irradiation range; and a light-shielding portion provided integrally with the light distribution portion, where the light-shielding portion engages with the light distribution portion to form a light-shielding receiving chamber, and the light-shielding receiving chamber is located outside the irradiation range. Additionally, the optical element of the light source module may be engaged with the substrate, the light distribution portion in the optical element may be located in a light-emitting direction of the light-emitting unit to receive the irradiated light emitted from the light-emitting unit and allow the irradiated light to be emitted upon distribution, and a partial region of the substrate may be located in the light-shielding receiving chamber.

Examples of the present disclosure further provide a light source module a lighting device. The light device may include a light source module where the light source module may include: a light-emitting unit; a substrate configured to support the light-emitting unit; and an optical element that may include: a light distribution portion configured to receive irradiated light emitted from the light-emitting unit and allow the irradiated light to be emitted upon distribution, where light emitted from the light distribution portion upon distribution has an irradiation range; and a light-shielding portion provided integrally with the light distribution portion, where the light-shielding portion engages with the light distribution portion to form a light-shielding receiving chamber, and the light-shielding receiving chamber is located outside the irradiation range.

Further, the optical element may be engaged with the substrate, the light distribution portion in the optical element may be located in a light-emitting direction of the light-emitting unit to receive the irradiated light emitted from the light-emitting unit and allow the irradiated light to be emitted upon distribution, and a partial region of the substrate may be located in the light-shielding receiving chamber The light device may also include a power supply wire electrically connected to the light-emitting unit in the light source module, where the power supply wire may be configured to obtain electric power from a power supply module and transmit the electric power to the light-emitting unit in the light source module.

It is to be understood that both the foregoing general description and the following detailed description are exemplary and explanatory only and are not restrictive of the present disclosure

BRIEF DESCRIPTION OF THE DRAWINGS

The drawings described herein are used for providing a further understanding of the present disclosure and constitute a part of the present disclosure. The examples of the present disclosure and the descriptions thereof are used for explaining the present disclosure but not to constitute any improper limitations to the present disclosure. In the drawings.

DETAILED DESCRIPTION

Figure 1:
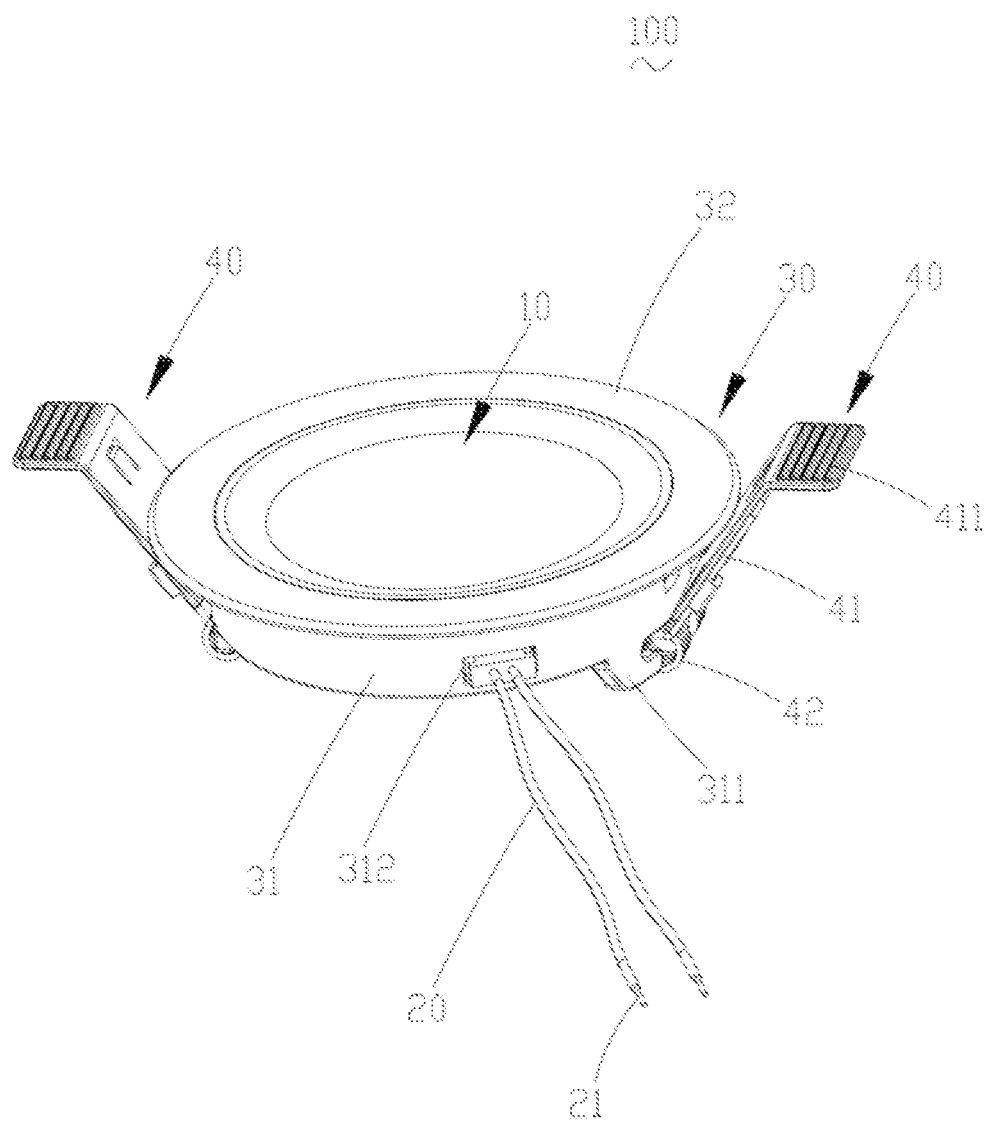
FIG. 1 is a perspective view of a lighting device according to an example of the present disclosure.

The examples of the disclosure provide an optical element, a light source module and a lighting device, which solve the problem that the light source module and the lighting device using the optical element are difficult to be assembled because the light distribution portion and the light-shielding portion in the optical element are separately arranged.

In order to make those skilled in the art to better understand the technical solutions in the present disclosure, the technical solutions of the examples will be described in a clearly and fully understandable way in connection with the drawings related to the examples of the present disclosure. Apparently, the described examples are just a part but not all of the examples of the present disclosure. Based on the described examples herein, those skilled in the art can obtain other example(s), without any inventive work, which should be within the scope of the present disclosure.

The terminology used in the present disclosure is for the purpose of describing exemplary examples only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise It shall be understood that, although the terms "first," "second," "third," and the like may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Sometimes, the lighting device includes a component to be shielded adjacent to the light-emitting unit, for example, a driving component configured to regulate electric power supplied to the light-emitting unit, and the like. The component to be shielded is typically shielded by a light-shielding portion made from an opaque material, so as to prevent the component to be shielded from being exposed to a vision field of a user and degrading aesthetics of the lighting device.

However, sometimes, the light-shielding portion and the light distribution portion are separated from each other, and need to be independently designed and manufactured. When installing the lighting device, the user needs to firstly assemble the light-shielding portion with the light distribution portion, and then assemble them with other structures in the lighting device, which increases the difficulty in assembling the lighting device, resulting in additional time for the user to assemble the lighting device, thereby reducing the user experience.

As illustrated in FIG. 1, in an example of the present disclosure, a lighting device 100 includes a light source module 10, a power supply wire 20, a cover 30, and a snap spring component 40.

The light source module 10 can be electrically connected to the power supply wire 20 and then electrically connected to a power supply module (not illustrated) through the power supply wire 20 to transmit electric power outputted by the power supply module to the light source module 10. The power supply wire 20 can be a common enameled metal wire. The power supply wire 20 is electrically connected to the power supply module through a conductive terminal 21 at an end of the power supply wire. The conductive terminal 21 can be a common contact type terminal, a copper terminal, or the like, which is the technique well known to those ordinary skills in the art, thus details are not described herein.

The power supply module can be a DC power supply, or can be an AC power supply such as a municipal power supply. The power supply module can be fixedly connected to a region such as a wall, a ceiling, a floor, or the like; correspondingly, the lighting device 100 can be configured as a lamp panel, a lantern, a chandelier, a ceiling lamp, a wall lamp, a lamp tube or the like. The power supply module can also be configured as movable, and then the lighting device 100 can be a movable desk lamp or a movable floor lamp.

The cover 30 covers the light source module 10. The cover 30 can be made of a hard material such as plastic or metal to protect the light source module 10. The shape of the cover 30 can be configured according to the shape of the light source module 10. For example, the light source module 10 is arranged in a disk shape, and the cover 30 can be arranged in an annular shape to cover a periphery of the light source module 10.

Figure 2:
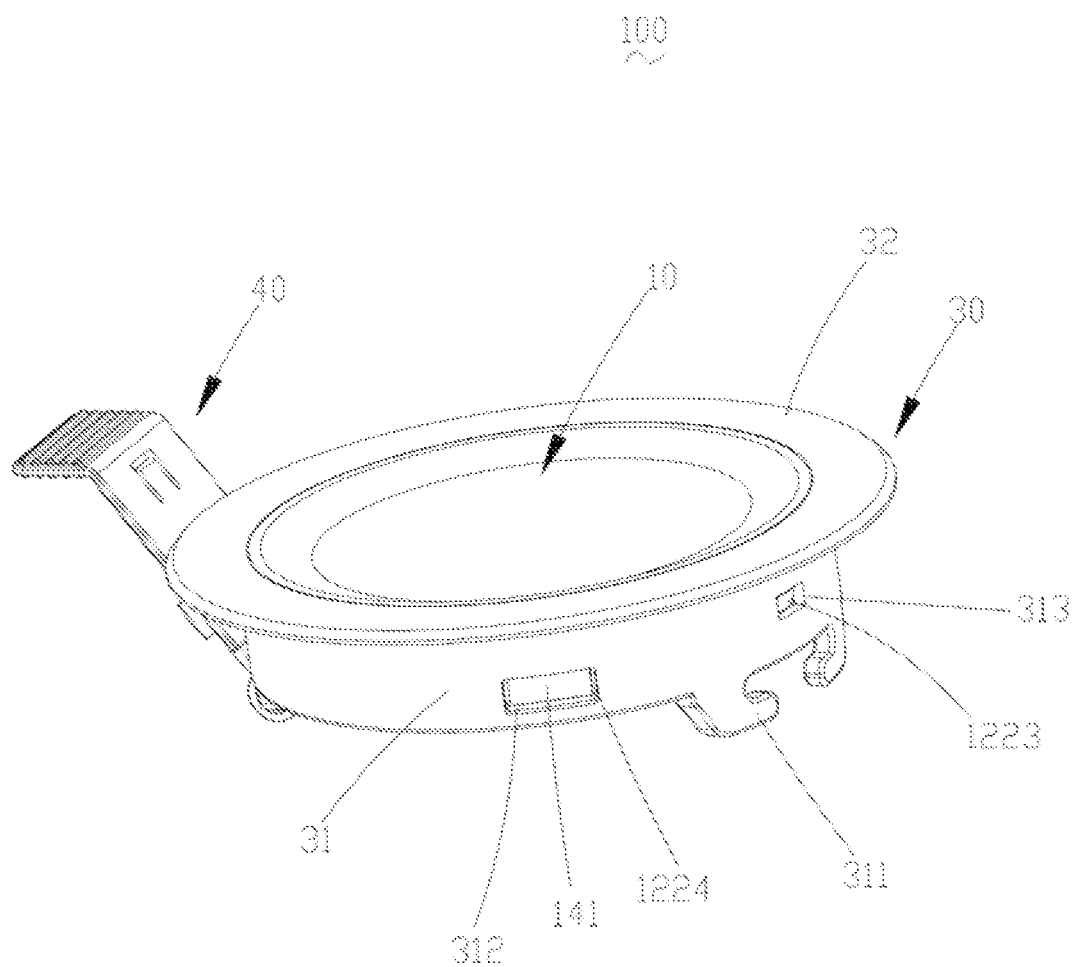
FIG. 2 is a perspective view illustrating a part of the lighting device of FIG. 1, in which a power supply wire and a snap spring component on one side are omitted.

As illustrated in FIG. 2, the cover 30 is further configured to fix the light source module 10 to a target area such as a ceiling or a wall. The cover 30 includes a side wall 31 and a front wall 32 extending from the side wall 31. The side wall 31 is annular to form a chamber (not labeled) configured to receive the light source module 10. The light source module 10 can be installed into the chamber by several manners such as snap-fit, interference-fit, and threading, etc. and is fixedly connected to the sidewall 31, so as to realize fixed connection between the light source module 10 and the cover 30. The front wall 32 extends away from the side wall 31 and is staggered with the side wall 31 so that the front wall 32 has a maximum width greater than that of the side wall 31.

A snap spring component 40 is provided at an outer periphery of the cover 30. The snap spring component 40 includes: a limiting arm 41 rotatably connected to the side wall 31; and an elastic member 42 such as a spring connected between the limiting arm 41 and the side wall 31. An elastic restoring force of the elastic element 42 causes the limiting arm 41 to be abutted against an edge of the front wall 32. In a practical application, two opposite mounting protrusions 311 are provided on an edge of the side wall 31. The mounting protrusions 311 extend toward each other, and the limiting arm 41 and the elastic member 42 both can be sleeved and supported on the two mounting protrusions 311 to realize installing the snap spring component 40 onto the cover 30.

In an actual process of installing the lighting device 100, a mounting hole (not illustrated) may be provided in a target area where the lighting device 100 is to be installed, and a size of the mounting hole may be set between a width of the front wall 32 and a width of the side wall 31, so that the side wall 31 can be received in the mounting hole while the front wall 32 is shielded by an edge of the mounting hole. Further, the limiting arm 41 is pushed to overcome the elastic restoring force of the elastic member 42, so that the limiting arm 41 is separated from the front wall 32, and is parallel and level with the side wall 31, thereby placing the side wall 31 having received the light source module 10 and the limiting arm 41 into the mounting hole. When the front wall 32 is closely attached onto an outer edge of the mounting hole, the limiting arm 41 is moved under the action of the elastic member 42 to be in close contact with an inner edge of the mounting hole, thereby installing the lighting device 100 to the target area by cooperation of the front wall 32 and the limiting arm 41 under the action of the elastic member 42.

In the example of the present disclosure, an end portion of the limiting arm 41 configured to be closely attached onto the inner edge of the mounting hole is further covered with an anti-slip layer 411, and the anti-slip layer 411 may be made of a material with high friction coefficient such as plastic to increase the tightness of the limiting arm 41 attached onto the inner edge of the mounting hole, thereby ensuring the stability of the installation of the lighting device 100.

The side wall 31 is further provided with a sidewall through hole 312. The sidewall through hole 312 penetrates the sidewall 31 and is connected to the light source module 10. The power supply wire 20 can pass through the sidewall through hole 312 and be electrically connected to the light source module 10 so that the electric power of the power supply module is transmitted to the light source module 10. A size of the sidewall through hole 312 can be set according to the size of the power supply wire 20 to ensure that the power supply wire 20 can easily pass through the sidewall through hole 312 to be electrically connected to the light source module 10.

Figure 3:
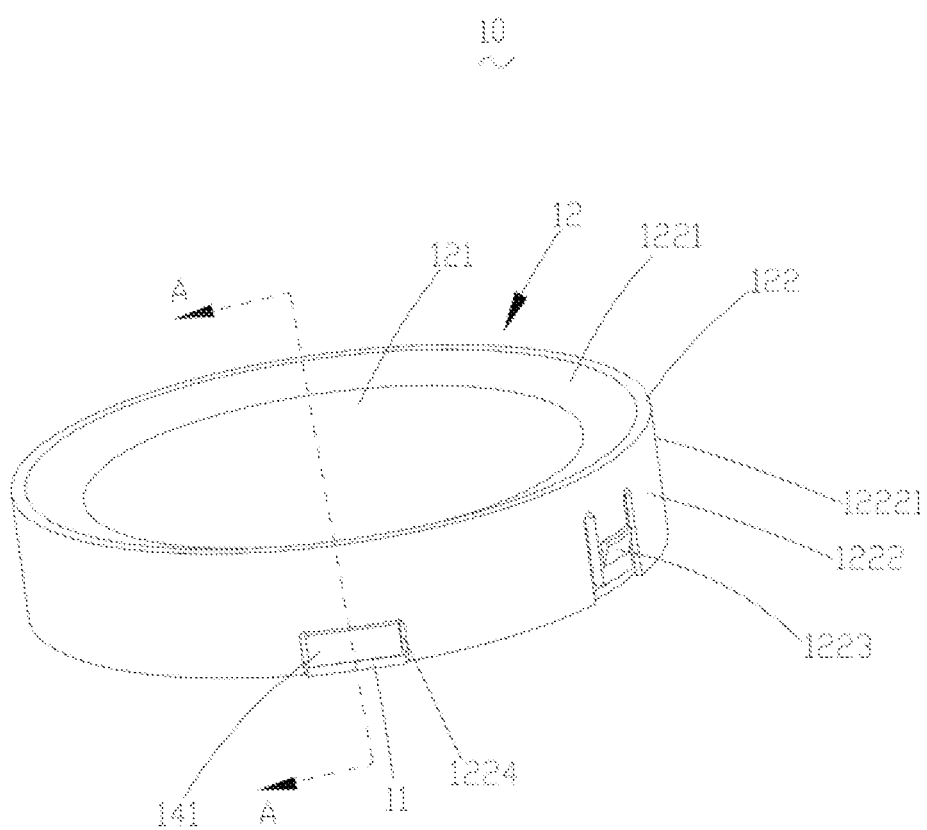
FIG. 3 is a perspective view of a light source module in the lighting device illustrated in FIG. 1.
Figure 4:
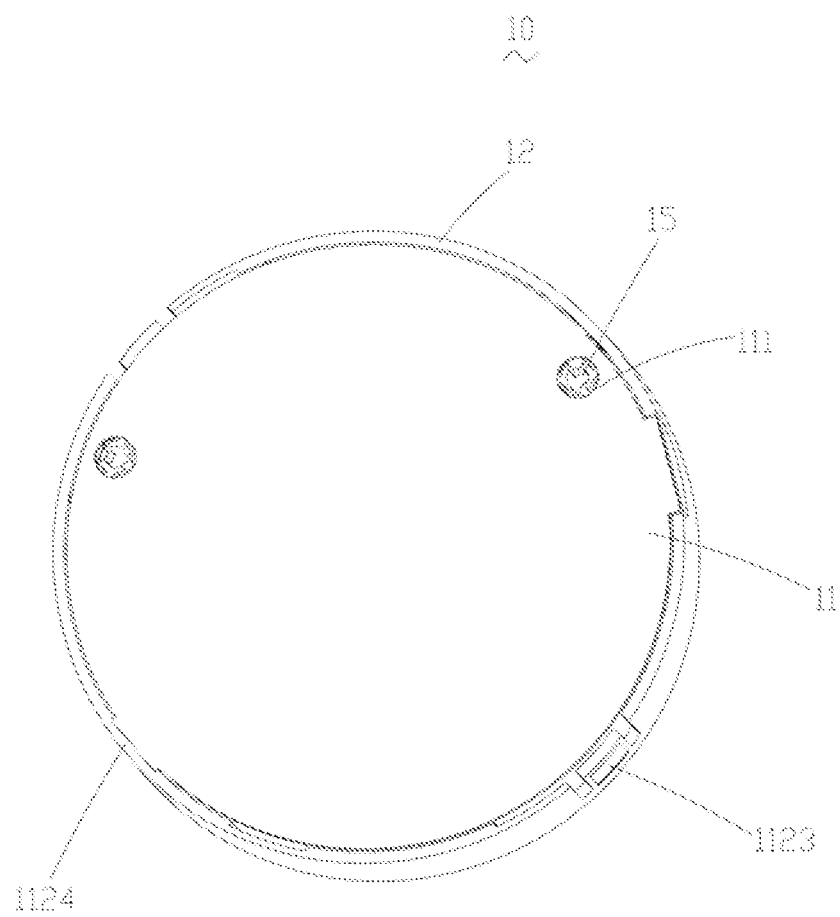
FIG. 4 is a perspective view of the light source module illustrated in FIG. 3 from another viewing angle.
Figure 5:
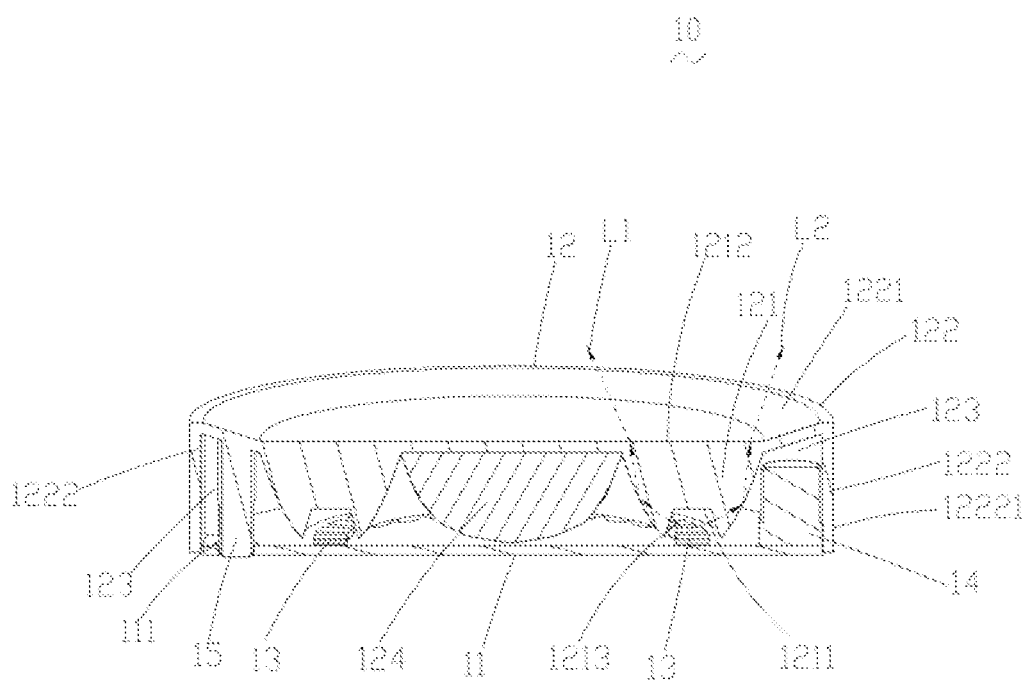
FIG. 5 shows a cross-sectional view of the light source module with lines A and A in FIG. 3.

As illustrated in FIG. 3 to FIG. 5, the light source module 10 includes a substrate 11 and an optical element 12 covering the substrate 11. The substrate 11 and the optical element 12 are oppositely fixed to ensure the stability of the structure of the light source module 10.

The substrate 11 may be a common printed circuit board, and a shape of the substrate 11 can be pre-configured according to the application scenario of the light source module 10, for example, the substrate 11 can be configured as a square plate, a circular plate, or the like. The substrate 11 is configured to support the light-emitting unit 13. The light-emitting unit 13 can be of various types such as an LED light source and a TL light source. The arrangement of the light-emitting units 13 can be configured according to the type of the lighting device 100, for example, the light-emitting units 13 can be arranged in a straight line or a ring shape, etc.

The optical element 12 includes a light distribution portion 121 and a light-shielding portion 122. The light distribution portion 121 and the light-shielding portion 122 are integrally provided. In a practical application, the light-shielding portion 122 can be formed by extending from the light distribution portion 121. Of course, the light distribution portion 121 and the light-shielding portion 122 can also be relatively independent, and then achieve integration through fixed connection, details are not described herein.

The light distribution portion 121 covers the light-emitting units 13 to protect the light-emitting units 13 from external damage and allow the irradiated light emitted from the light-emitting unit 13 to be emitted upon distribution. The light distribution portion 121 can adopt a lens through which the irradiated light emitted from the light-emitting unit 13 can be directly transmitted, and can also adopt a form of a light-mixing cover which can uniformly adjust the irradiated light emitted from the light-emitting unit 13. Whether in a form of lens or light-mixing cover, the shape of the light distribution portion 121 can be pre-configured according to the lighting environment or the arrangement manner of the the light-emitting units. For example, the light distribution portion 121 can be configured in a linear type, in a ring type, or the like. The number of the light distribution portion 121 may be identical or inconsistent with the number of the light-emitting unit 13. For example, one light-emitting unit 13 is provided with one light distribution portion 121, or a plurality of light-emitting units 13 may be provided with one light distribution portion 121.

In the example of the present disclosure, the plurality of light-emitting units 13 are provided with one light distribution portion 121. The light distribution portion 121 includes a light incident surface 1211 configured to receive the irradiated light emitted from the light-emitting units 13 and a light emergent surface 1212 configured to allow the irradiated light to be emitted upon distribution. A shape of the light incident surface 1211 and the light emergent surface 1212 can be configured according to requirements, for example, the light incident surface 1211 and the light emergent surface 1212 both are configured as a curved surface, or both are configured as a planar surface, or only the light incident surface 1211 is configured as a curved surface while the light emergent surface 1212 is configured as a planar surface.

The light distribution portion 121 further includes a light-transmitting receiving chamber 1213 recessed at a bottom portion of the light distribution portion 121. A shape of the light-transmitting receiving chamber 1213 can be configured according to requirements. For example, in the case where the light distribution portion 121 is an annular first optical portion, the light-transmitting receiving chamber 1213 may be designed as an annular receiving chamber which extends in the same direction as the light distribution portion 121.

The light incident surface 1211 constitutes a chamber wall surface of the light-transmitting receiving chamber 1213, the irradiated light emitted from the light-emitting unit 13 in the light-transmitting receiving chamber 1213 will be directly received by the light incident surface 1211, then internally distributed by the light distribution portion 121, and finally reach and exit from the light emergent surface 1212.

In a practical application, the emitted light that is distributed by the light distribution portion 121 has an irradiation range, and the irradiation range should be an area starting from the light emergent surface 1212. All the objects in this area can be irradiated by the light distributed by the light distribution portion 121.

In the example of the present disclosure, the case where the irradiated light emitted from the light-emitting unit 13 is in a radial form is described by way of example, given that the outermost, irradiated light beams emitted from the light-emitting unit 13 receivable by the light incident surface 1211 at both sides are L1 and L2, respectively, then light in a range defined by L1 and L2 can be received by and emitted from the light incident surface 1211, while light outside the region defined by L1 and L2 cannot be received by the light incident surface 1211. Therefore, after passing through the light emergent surface 1212, L1 and L2 form borders of the irradiation range of the light emitted from the light distribution portion 121, and a spatial region between the light L1 and light L2 is just the aforementioned irradiation range. In a practical application, the shape of the light distribution portion 121 is designed such that the irradiation range of the light upon distribution is an annular region having a fan-shaped cross section and started from the light emergent surface 1212.

The light-shielding portion 122 is made of a non-transparent material, and the light-shielding portion 122 is engaged with the light distribution portion 121 to form the light-shielding receiving chamber 123. Due to the presence of the light-shielding portion 122, the objects located in the light-shielding receiving chamber 123 are shielded and cannot be observed by the user's eyes.

The light-shielding receiving chamber 123 is located outside the irradiation range of the light distribution portion 121, that is, the light-shielding receiving chamber 123 and the light-shielding portion 122 constituting the light-shielding receiving chamber 123 will not interfere with the irradiated light emitted from the light distribution portion 121, thereby ensuring normal operation of the light source module 10.

In a practical application, the light-shielding portion 122 may extend from the light distribution portion 121 in a direction substantially parallel and level with the light emergent surface 1212 of the light distribution portion 121 so that the light-shielding portion 122 will not extend into the irradiation range of the light distribution portion 121. It is also ensured that the light shielding receiving chamber 123 is outside the irradiation range. Preferably, the light-shielding portion 122 may be disposed around a circumference of the light distribution portion 121, and the light-shielding receiving chamber 123 formed by engaging the light-shielding portion 122 with the light distribution portion 121 may also be disposed around the circumference of the light distribution portion 121.

In the example of the present disclosure, the light-shielding portion 122 includes a front panel 1221 connected to the light distribution portion 121, and a side panel 1222 connected to the front panel 1221. The front panel 1221 can extend from the light emergent surface 1212 of the light distribution portion 121, and be substantially parallel and level with the light emergent surface 1212. Preferably, the front panel 1211 can be a slope inclined from an edge, and can be parallel and level with the light emergent surface 1212 at the lowest point of the slope, so that the light emergent surface 1212 and the front panel 1221 can form a recessed end surface, thereby improving the aesthetics of the light source module 10. Moreover, the heights of the side panel 1222 and the light distribution portion 121 with respect to the light emergent surface 1212 or the front panel 1221 are substantially the same, so that the weight of the optical element 10 is uniformly distributed.

In a practical application, the side panel 1222 is disposed to be staggered with the front panel 1221, so that the front panel 1221, the side panel 1222 and the light distribution portion 121 can be engaged with each other to form the light-shielding receiving chamber 123 having an opening.

In a practical application, a size of the substrate 11 can be configured according to a size of the side panel 1222, so that the substrate 11 can be just received by the side panel 1222, and the light source module 10 is more integrated. Because the front panel 1221, the side panel 1222 and the light distribution portion 121 can be engaged with each other to form the light-shielding receiving chamber 123 having an opening, the opening of the light-shielding receiving chamber 123 is directly facing the substrate 11 so that a part of the substrate 11 can be received in the light-shielding receiving chamber 123.

The front panel 1221 and the side panel 1222 constitute a base body of the light-shielding portion 122. A light-shielding coating layer (not labeled) made of a material such as white paint may be coated on the base body, so that objects in the light-shielding receiving chamber 123 can be shielded by the light-shielding portion 122. In a practical application, the base body can extend from the light distribution portion 121 and have the same material as that of the light distribution portion 121, thereby improving the production efficiency of the base body, and then the light-shielding coating layer is coated on the base body to realize the rapid manufacture of the integrated optical element 12.

In the example of the present disclosure, the size of the side panel 1222 is matched with the size of the side wall 31 of the cover 30 so that the side panel 1222 can be received in the side wall 31 while an outer side surface 12221 of the side panel 1222 is attached onto the cover 30. The optical element 12 can be fastened with the cover 30 in a snap-fit manner. Specifically, the light-shielding portion 122 further includes a buckle 1223 located on the side panel 1222. The side wall 31 is provided with a side hole 313, and the buckle 1223 can be inserted into the side hole 313, so that the side panel 1222 and the side wall 31 are fixed with respect to each other. Of course, a side hole may also be disposed in the light-shielding portion 122, and a buckle may also be disposed on the side wall of the cover 30, so that the side panel 1222 and the side wall 31 may also be fixed with respect to each other.

Preferably, in the case where the side hole 313 is located in the side wall 31, the side hole 313 is located above the mounting protrusion 311 to shield the side hole 313 and the buckle 1223 in the side hole 313 by the snap spring component 40 mounted on the mounting protrusion 311, thereby improving the aesthetics of the lighting device 100.

In a practical application, the light source module 10 further includes a driving unit 14 located on the substrate 11, the driving unit 14 is electrically connected to the light-emitting units 13, and the driving unit 14 includes a power supply interface 141, the power supply interface 141 is configured to be connected to the power supply wire 20 to obtain electric power from the power supply module through the power supply wire 20. Subsequently, the electric current outputted by the power supply module can be regulated by the driving unit 14, and then transmitted to the light-emitting unit 13, or the electric current outputted by the power supply module can be directly transmitted to the light-emitting unit 13 without regulation.

In the example of the present disclosure, the driving unit 14 is located in the light-shielding receiving chamber 123, so that the light-shielding portion 122 is further configured to shield the driving unit 14 so as to improve the aesthetics of the light source module 10.

The driving unit 14 may further include functional units such as a conventional over-current protection unit, over-discharge protection unit, and the like. For example, the over-current protection unit may acquire an electric current supplied to the light-emitting unit 13. When the electric current is too large, the electric current supplied to the light source module 10 is turned off to realize the over-current protection of the light source module 10. Details are not described herein.

In a practical application, the light-shielding portion 122 further includes a side through hole 1224 passing through the side panel 1222. A size of the side through hole 1224 is close to a size of the power supply interface 141 in the driving unit 14. After the side through hole 1224 is aligned with the power supply interface 141, the power supply wire 20 can be electrically connected to the driving unit 14 by passing through the side through hole 1224 and the power supply interface 141 in sequence.

Preferably, a size of the side wall through hole 312 of the cover 30 is close to a size of the side through hole 1224. When the cover 30 is mounted on the light source module 10, the side wall through hole 312 is aligned with the side through hole 1224, and the power supply wire 20 is electrically connected to the driving unit 14 by passing through the sidewall through hole 312, the side through hole 1224 and the power supply interface 141, in sequence, from the outside of the cover 30.

The light source module 10 further includes a mounting portion 15 configured to mount the optical element 12 on the substrate 11. The mounting portion 15 is fixedly connected to the optical element 12 and then mounted on the substrate 11, thereby realizing fixed connection of the optical element 12 and the substrate 11.

In a practical application, the mounting portion 15 can adopt a protruding post integrally formed with the optical element 12, and the substrate 11 is provided with a positioning hole 111. The mounting portion 15 extends toward the substrate 11 and can be locked in the positioning hole 111 to achieve locking the optical element 12 with the substrate 11. As for the locking structure of the mounting portion 15 and the positioning hole 111, various methods such as interference-fit and snap-fit may be used, and details are not described herein.

In the example of the present disclosure, the mounting portion 15 is disposed on the front panel 1221 or the side panel 1222, so that the mounting portion 15 is located in the light-shielding receiving chamber 123 and can be shielded by the light-shielding portion 122, thereby improving aesthetics of the light source module 10.

In the example of the present disclosure, in the case where the light distribution portion 121 is an annular first optical portion, the optical element 12 further includes a second optical portion 124 located at a center of the annular first optical portion, and the second optical portion 124 may be a diamond-shaped lens. An outer surface of the diamond-shaped lens is constituted by a plurality of non-coplanar regular patterns, so that the diamond-shaped lens 124 is difficult to be observed completely at a glance, thereby shielding a blank area at a center of the annular light distribution portion 121, and improving aesthetics of the light source module 10. Due to the presence of the second optical portion 124, the annular light distribution portion 121 is far away from the center of the optical element 12 and is close to the light-shielding portion 122.

In a practical application, the first optical portion serving as the light distribution portion 121 and the second optical portion located at the center of the first optical portion may be integrally formed, or may be separately provided and assembled together; the two portions may be made of the same material or different materials. Details are not described herein.

In summary, for the optical element 12, the light source module 10 using the optical element 12, and the lighting device 100 using the light source module 10 provided by the examples of the present disclosure, by integrally providing the light distribution portion 121 and the light-shielding portion 122 in the optical element, the optical element 12 can be quickly installed, the difficulty in assembling the light source module 10 and assembling the lighting device 100 is reduced, the installation time of the lighting device cost by the user is saved, and the user experience is improved.

The present disclosure is to provide an optical element as well as a light source module and a lighting device using the same, which can reduce the difficulty in assembling the lighting device.

Examples of the present disclosure provide an optical element for a light source module in a lighting device, the light source module includes a light-emitting unit for emitting irradiated light, the optical element includes: a light distribution portion configured to receive the irradiated light emitted from the light-emitting unit and allow the irradiated light to be emitted upon distribution, the light emitted from the light distribution portion upon distribution has an irradiation range; and a light-shielding portion provided integrally with the light distribution portion, the light-shielding portion is engaged with the light distribution portion to form a light-shielding receiving chamber, the light-shielding receiving chamber is located outside the irradiation range.

Preferably, the light distribution portion includes a first optical portion in an annular shape.

Preferably, the optical element further includes a second optical portion disposed at a center of the first optical portion which is in an annular shape.

Preferably, the second optical portion includes a lens in a diamond shape.

Preferably, the light distribution portion includes: a light incident surface configured to receive the irradiated light emitted from the light-emitting unit, and a light emergent surface configured to emit the irradiated light upon distribution, the light incident surface is a curved surface, and the light emergent surface is a planar surface.

Preferably, the light distribution portion includes a light-transmitting receiving chamber configured to receive the light-emitting unit.

Preferably, the light-shielding portion is provided around a circumference of the light distribution portion.

Preferably, the light-shielding receiving chamber is provided around a circumference of the light distribution portion.

Preferably, the light-shielding portion includes: a base body extending from the light distribution portion; and a light-shielding coating layer covering the base body.

Preferably, the light-shielding coating layer includes a white paint.

Preferably, the light-shielding portion includes a front panel connected to the light distribution portion and a side panel connected with the front panel in a staggered manner, and the front panel and the side panel are engaged with the light distribution portion to form the light-shielding receiving chamber.

Preferably, the light-shielding portion includes a positioning member configured to be fixedly connected to the light-emitting unit, and the positioning member is located in the light-shielding receiving chamber.

Preferably, the lighting device includes a cover covering the optical element, and the cover is snap-fitted with the light-shielding portion in the optical element.

Preferably, the lighting device includes a power supply wire, the light-shielding portion includes a side through hole, and the power supply wire passes through the side through hole and is electrically connected to the light source module.

Examples of the present disclosure provide a light source module, including: a light-emitting unit; a substrate configured to support the light-emitting unit; and the above-mentioned optical element, wherein the optical element is engaged with the substrate, the light distribution portion in the optical element is located in a light-emitting direction of the light-emitting unit to receive the irradiated light emitted from the light-emitting unit and allow the irradiated light to be emitted upon distribution, and a partial region of the substrate is located in the light-shielding receiving chamber.

Preferably, the light source module includes a driving unit located on the substrate, wherein the driving unit is electrically connected to the light-emitting unit to regulate an electric current supplied to the light-emitting unit, and the driving unit is located in the light-shielding receiving chamber.

Preferably, the driving unit includes a power supply interface configured to be connected to the power supply wire, the light-shielding portion in the optical element includes a side through hole, and the side through hole is disposed to be aligned with the power supply interface.

Preferably, the substrate is received in the optical element.

Preferably, the light-shielding portion includes a positioning member configured to be fixedly connected to the substrate, and the positioning member is located in the light-shielding receiving chamber.

Examples of the present disclosure provide a lighting device, including: the above-mentioned light source module; and a power supply wire electrically connected to the light-emitting unit in the light source module, wherein the power supply wire is configured to obtain electric power from a power supply module and transmit the electric power to the light-emitting unit in the light source module.

Preferably, the lighting device includes a cover covering the optical element in the light source module.

Preferably, the cover is configured to be attached onto an outer side surface of the light-shielding portion in the optical element.

Preferably, the cover includes a sidewall through hole, the power supply wire passes through the sidewall through hole.

Preferably, the lighting device includes a snap spring component movably connected to the cover.

As can be seen from the technical solutions provided by the examples of the present disclosure, in the optical element, the light source module using the optical element, and the lighting device using the light source module provided by the example of the present disclosure, by integrally arranging the light distribution portion and the light-shielding portion in the optical element, the optical element can be quickly installed, which reduces the difficulty in assembling the light source module and the lighting device and saves the time cost for installing the lighting device by the user, thereby improving the user experience.

The various examples in the specification are described in a progressive manner, and the same or similar parts between the various examples may be referred to each other, and each example focuses on the differences from the other examples. In particular, for the system example, because it is basically similar to the method example, the description is relatively simple, and the relevant parts can be referred to the description of the method example.

The present disclosure may include dedicated hardware implementations such as application specific integrated circuits, programmable logic arrays and other hardware devices. The hardware implementations can be constructed to implement one or more of the methods described herein. Applications that may include the apparatus and systems of various examples can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the computing system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

The examples described above further describe the objectives, technical solutions and beneficial effects of the present disclosure in detail. It should be understood that the above descriptions are merely examples of the present disclosure and are not intended to limit the present disclosure. Any modification, equivalent replacement, improvement, etc. made within the spirit and principle of the present disclosure should be included in the protection scope of the present disclosure.

In addition, it should be noted that the language used in the specification has been selected for the purpose of readability and teaching, and is not intended to be construed as explaining or limiting the present disclosure. Therefore, many modifications and variations will be apparent to those skilled in the art without departing from the scope of the present disclosure. The disclosure of the present disclosure is intended to be illustrative, and not restrictive.

What is claimed is:

1. An optical element for matching with a light-emitting unit in a light source module of a lighting device, comprising:
    a light distribution portion configured to receive irradiated light emitted from the light-emitting unit and allow the irradiated light to be emitted upon distribution, wherein light emitted from the light distribution portion upon distribution has an irradiation range; and
    a light-shielding portion provided integrally with the light distribution portion, wherein the light-shielding portion is formed by extending from the light distribution portion, and the light-shielding portion engages with the light distribution portion to form a light-shielding receiving chamber, and the light-shielding receiving chamber is located outside the irradiation range.

2. The optical element according to claim 1, wherein the light distribution portion comprises a first optical portion in an annular shape.

3. The optical element according to claim 2, wherein the optical element further comprises a second optical portion disposed at a center of the first optical portion which is in an annular shape.

4. The optical element according to claim 3, wherein the second optical portion comprises a lens in a diamond shape.

5. The optical element according to claim 1, wherein the light distribution portion comprises:
    a light incident surface configured to receive the irradiated light emitted from the light-emitting unit, and a light emergent surface configured to emit the irradiated light upon distribution, wherein the light incident surface is a curved surface, and the light emergent surface is a planar surface.

6. The optical element according to claim 1, wherein the light distribution portion comprises a light-transmitting receiving chamber configured to receive the light-emitting unit.

7. The optical element according to claim 1, wherein the light-shielding portion is provided around a circumference of the light distribution portion.

8. The optical element according to claim 7, wherein the light-shielding receiving chamber is provided around a circumference of the light distribution portion.

9. The optical element according to claim 1, wherein the light-shielding portion comprises:
    a base body extending from the light distribution portion; and
    a light-shielding coating layer covering the base body.

10. The optical element according to claim 9, wherein the light-shielding coating layer comprises a white paint.

11. The optical element according to claim 1, wherein the light-shielding portion comprises: a front panel connected to the light distribution portion, and a side panel connected with the front panel in a staggered manner, wherein the front panel and the side panel are engaged with the light distribution portion to form the light-shielding receiving chamber.

12. The optical element according to claim 1, wherein the light-shielding portion comprises a positioning member configured to be fixedly connected to the light-emitting unit, and the positioning member is located in the light-shielding receiving chamber.

13. The optical element according to claim 1, wherein:
the lighting device further comprises a cover covering the optical element, and
the cover is snap-fitted with the light-shielding portion in the optical element.

14. The optical element according to claim 1, wherein:
the lighting device further comprises a power supply wire,
the light-shielding portion comprises a side through hole, and
the power supply wire passes through the side through hole and is electrically connected to the light source module.

15. A light source module, comprising:
a light-emitting unit;
a substrate configured to support the light-emitting unit; and
an optical element that comprises:
a light distribution portion configured to receive irradiated light emitted from the light-emitting unit and allow the irradiated light to be emitted upon distribution, wherein light emitted from the light distribution portion upon distribution has an irradiation range; and
a light-shielding portion provided integrally with the light distribution portion, wherein the light-shielding portion is formed by extending from the light distribution portion, and the light-shielding portion engages with the light distribution portion to form a light-shielding receiving chamber, and the light-shielding receiving chamber is located outside the irradiation range; and
wherein the optical element is engaged with the substrate, the light distribution portion in the optical element is located in a light-emitting direction of the light-emitting unit to receive the irradiated light emitted from the light-emitting unit and allow the irradiated light to be emitted upon distribution, and a partial region of the substrate is located in the light-shielding receiving chamber.

16. The light source module according to claim 15, wherein:
the light source module comprises a driving unit located on the substrate,
the driving unit is electrically connected to the light-emitting unit to regulate an electric current supplied to the light-emitting unit, and
the driving unit is located in the light-shielding receiving chamber.

17. The light source module according to claim 16, wherein:
the driving unit comprises a power supply interface configured to be connected to the power supply wire, the light-shielding portion in the optical element comprises a side through hole, and the side through hole is disposed to be aligned with the power supply interface.

18. The light source module according to claim 15, wherein the substrate is received in the optical element.

19. The light source module according to claim 15, wherein the light-shielding portion comprises a positioning member configured to be fixedly connected to the substrate, and the positioning member is located in the light-shielding receiving chamber.

20. A lighting device, comprising:
a light source module that comprises:
a light-emitting unit;
a substrate configured to support the light-emitting unit; and
an optical element that comprises:
a light distribution portion configured to receive irradiated light emitted from the light-emitting unit and allow the irradiated light to be emitted upon distribution, wherein light emitted from the light distribution portion upon distribution has an irradiation range; and
a light-shielding portion provided integrally with the light distribution portion, wherein the light-shielding portion is formed by extending from the light distribution portion, and the light-shielding portion engages with the light distribution portion to form a light-shielding receiving chamber, and the light-shielding receiving chamber is located outside the irradiation range; and
wherein the optical element is engaged with the substrate, the light distribution portion in the optical element is located in a light-emitting direction of the light-emitting unit to receive the irradiated light emitted from the light-emitting unit and allow the irradiated light to be emitted upon distribution, and a partial region of the substrate is located in the light-shielding receiving chamber; and
a power supply wire electrically connected to the light-emitting unit in the light source module, wherein the power supply wire is configured to obtain electric power from a power supply module and transmit the electric power to the light-emitting unit in the light source module.

* * * * *